(12) United States Patent
Tanioka

(10) Patent No.: US 7,472,348 B2
(45) Date of Patent: Dec. 30, 2008

(54) IMAGE PROCESSING APPARATUS, IMAGE PROCESSING METHOD AND STORAGE MEDIUM USING CHARACTER SIZE AND WIDTH FOR MAGNIFICATION

(75) Inventor: Hiroshi Tanioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 10/697,983

(22) Filed: Oct. 31, 2003

(65) Prior Publication Data

US 2004/0114804 A1 Jun. 17, 2004

Related U.S. Application Data

(63) Continuation of application No. 09/433,558, filed on Nov. 4, 1999, now abandoned.

(30) Foreign Application Priority Data

Nov. 5, 1998 (JP) .................. 10-314635
Nov. 2, 1999 (JP) .................. 11-312624

(51) Int. Cl.
*G06F 17/00* (2006.01)
(52) U.S. Cl. .................. 715/269; 715/252; 382/176
(58) Field of Classification Search .................. 715/542, 715/244, 269, 252; 382/176
See application file for complete search history.

(56) References Cited

U.S. PATENT DOCUMENTS

| | | | | |
|---|---|---|---|---|
| 3,295,105 A * | 12/1966 | Gray et al. | .................. | 382/292 |
| 4,003,023 A * | 1/1977 | Benson et al. | .............. | 382/177 |
| 4,731,861 A * | 3/1988 | Blanton et al. | .............. | 382/174 |
| 4,962,465 A * | 10/1990 | Saito et al. | .................. | 345/467 |
| 5,150,108 A * | 9/1992 | Markham | ................... | 345/471 |
| 5,513,278 A * | 4/1996 | Hashizume et al. | ......... | 382/187 |
| 5,563,958 A * | 10/1996 | Higgins et al. | .............. | 382/183 |
| 5,566,252 A * | 10/1996 | Miyaza | ....................... | 382/298 |
| 5,579,416 A * | 11/1996 | Shibuya et al. | .............. | 382/293 |
| 5,586,242 A * | 12/1996 | McQueen et al. | ........... | 345/467 |
| 5,592,565 A * | 1/1997 | Shojima et al. | ............. | 382/185 |
| 5,778,403 A * | 7/1998 | Bangs | ........................ | 715/210 |
| 5,889,897 A * | 3/1999 | Medina | ...................... | 382/310 |
| 5,946,001 A * | 8/1999 | Isaka | .......................... | 345/470 |
| 6,088,478 A * | 7/2000 | Davies | ....................... | 382/168 |
| 6,272,238 B1 * | 8/2001 | Kugai | .......................... | 382/165 |
| 6,337,924 B1 * | 1/2002 | Smith | ......................... | 382/190 |
| 6,744,921 B1 * | 6/2004 | Uchida et al. | ............... | 382/185 |
| 6,970,257 B2 * | 11/2005 | Endo et al. | .................... | 358/1.1 |

(Continued)

FOREIGN PATENT DOCUMENTS

JP    58-022486    2/1983

(Continued)

*Primary Examiner*—Amelia Rutledge
(74) *Attorney, Agent, or Firm*—Fitzpatrick, Cella, Harper & Scinto

(57) ABSTRACT

According to the present invention, the quality of a small character can be prevented from lowering during copy of an image in an original. An image in an original is read by a scanner, and a recognition unit performs detection of a character size and a character position as well as character recognition. A CPU reads a font from a dictionary in accordance with the recognized character recognized by the recognition unit, and an image is generated based on the character size and the character position detected by the recognition unit and a copy magnification set by an MMI.

7 Claims, 9 Drawing Sheets

U.S. PATENT DOCUMENTS

2002/0136456 A1 9/2002 Tanioka ..................... 382/187

FOREIGN PATENT DOCUMENTS

| JP | 02-289066 | * | 3/1989 |
| JP | 2-96885 | | 4/1990 |
| JP | 02-96885 | * | 5/1990 |
| JP | 2-289066 | | 11/1990 |
| JP | 3-103996 | | 4/1991 |
| JP | 4-084380 | | 3/1992 |
| JP | 5-119761 | | 5/1993 |
| JP | 8-30717 | | 2/1996 |
| JP | 8-30717 A | * | 2/1996 |
| JP | 9-016582 | | 1/1997 |
| JP | 9-161049 | | 6/1997 |

* cited by examiner

図1に実施例のブロック構成図を示し、以下、各構成要素をその動作と共に説明する

原稿1001は画像読み取り部1002のレンズ101よりCCD102を通しA/D変換を行うA/Dコンバータ103に入り、A/D変換後の信号が画像処理部1003に入力される。画像処理部1003では、シェーディング補正104を行って、モード切り替え回路105へと進む。

IMAGE PROCESSING APPARATUS, IMAGE PROCESSING METHOD AND STORAGE MEDIUM USING CHARACTER SIZE AND WIDTH FOR MAGNIFICATION

This application is a continuation of application Ser. No. 09/433,558, filed Nov. 4, 1999.

BACKGROUND OF THE INVENTION

1. Field of the Invention

The present invention relates to an image processing apparatus for recognizing characters in a read image and generating a reproduced image based on the recognized characters. Further, the present invention relates to an image processing apparatus, e.g., a so-called digital copying machine or facsimile machine for transferring the thus-obtained reproduced image to an external device.

2. Related Background Art

In the character recognition technology, recent speeding up of a CPU and a semiconductor has enabled the processing in substantially real time at not much higher than the copying speed of a low-speed copier. Further, since most of originals to be copied are created by using a word processor and the like in late years, the accuracy in character recognition has been enhanced and come into practical use.

Additionally, the present applicant has already disclosed the technique for recognizing a character size or a character in an original in, e.g., Japanese Patent Application Laid-Open No. 61-107876 and the like.

Incidentally, since this type of copying machine sets down and processes an image as resolved dots obtained at a predetermined resolution, the reproduced image is liable to quality deterioration in principle when copying a document which has been once copied, particularly when microcopying the document.

Furthermore, although this recent type of apparatus has a function to convert image information to a predetermined resolution to be transferred to an external system in addition to a mere copying function, a problem may occur when uniformly processing the image at a resolution for transmission.

SUMMARY OF THE INVENTION

In view of the above-described prior art, it is therefore an object of the present invention to provide a copying apparatus for recognizing a character from an image and expanding the character to a dot font in accordance with a result of recognition to reproduce a copy image. Particularly, an object of the present invention is to generate an image reproduced at a variable power or an image to be transferred.

The present invention provides an image processing apparatus comprising: a reading means for reading an image in an original; a character recognizing means for recognizing a character in the image read by the reading means; a readout means for reading a character font from the storing means in response to a result of recognition obtained by the character recognizing means; a detecting means for detecting information concerning the character in the image read by the reading means; and a generating means for generating a reproduced image based on the character font read by the readout means and the information concerning the character detected by the detecting means.

Further, the present invention provides an image processing apparatus comprising: a reading means for reading an image in an original; a recognizing means for recognizing a character in the image read by the reading means at a first resolution; and a generating means for substituting a font having a second resolution lower than the first resolution for the character recognized by the recognizing means to generate a reproduced image.

Furthermore, the present invention provides an image processing apparatus comprising: a reading means for reading an image in an original; a recognizing means for recognizing a character in the image read by the reading means; and a generating means for substituting an ornament-processed font for the character recognized by the recognizing means to generate a reproduced image.

Other objects, structures and advantages of the present invention will be apparent from the following detailed description and the accompanying drawings.

DESCRIPTION OF THE PREFERRED EMBODIMENTS

First Embodiment

Figure 1:
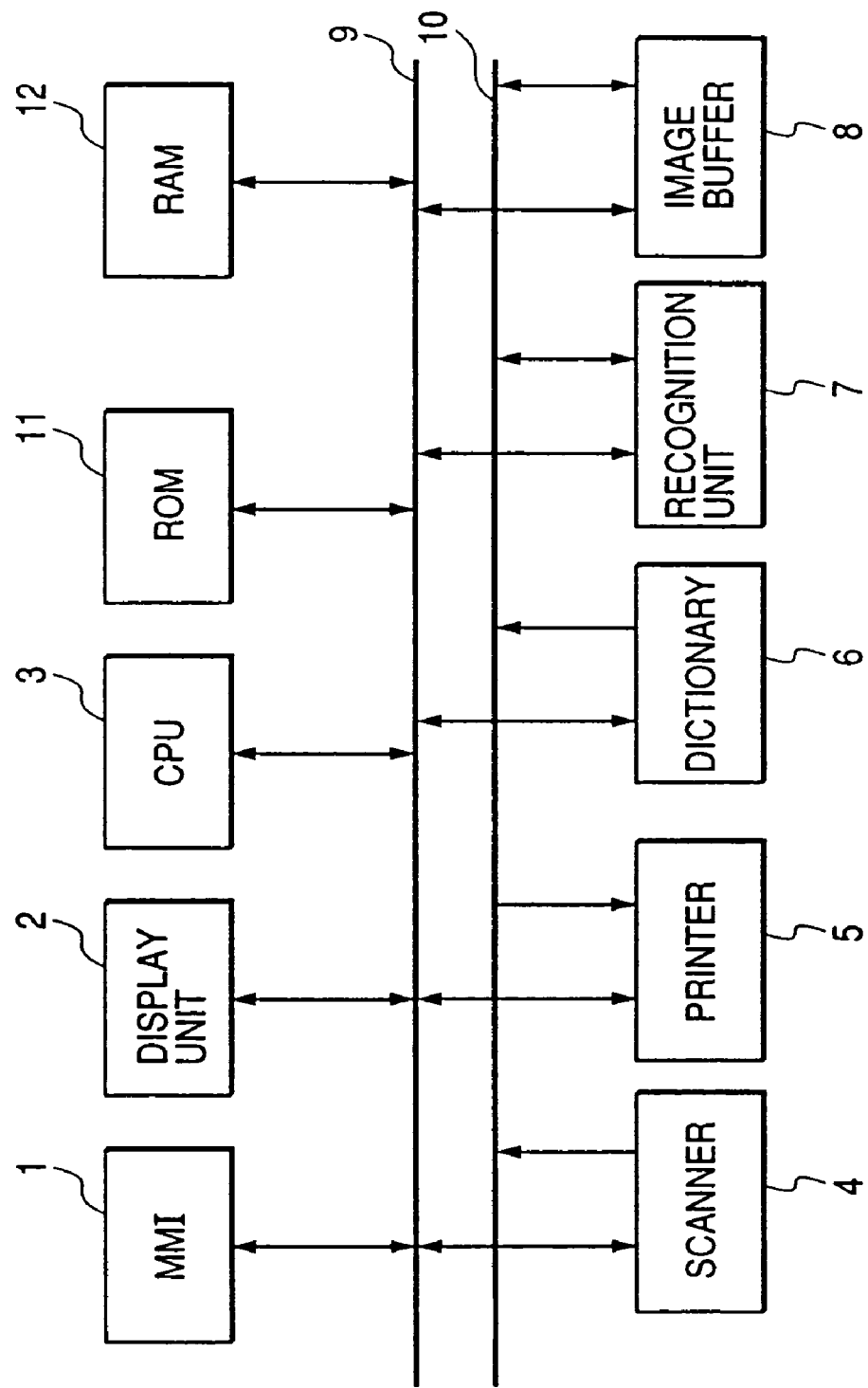
FIG. 1 is a block diagram showing an image processing apparatus according to a preferred embodiment of the present invention.

FIG. 1 is a block diagram showing an image processing apparatus which is a preferred embodiment according to the present invention. A CPU 3 reads an image in an original by controlling a scanner 4 through a bus 9, and image data read by the scanner 4 is accumulated and stored in an image buffer 8 via an image data bus 10. A recognition unit 7 detects a size and a position of a character in the original from the image data stored in the image buffer 8 and recognizes the character in the image data by making reference to a dictionary 6 to temporarily hold a result of character recognition, size information and position information in the image buffer 8.

After determining a size, a font type and others of the character used for a reproduced image in accordance with an instruction inputted from an MMI unit 1, character codes which have been already stored are sequentially expanded to dot font information and again held as recording dot information in the image buffer 8. This dot information is then supplied to a printer 5 to be recorded. In this manner, image recording and reproduction of a smaller character, which can not be obtained by the prior art digital copying machine, as a clear font character can be performed.

Figure 2:
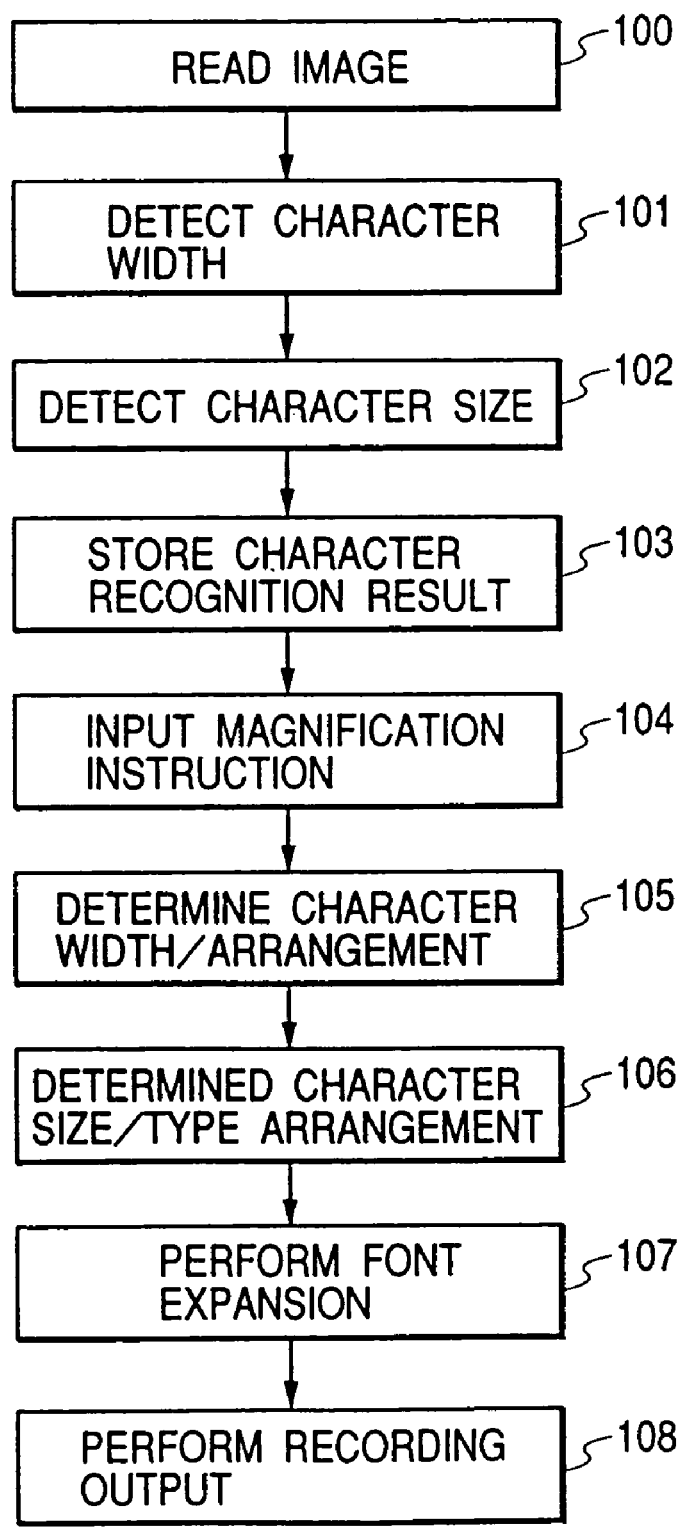
FIG. 2 is a flow chart showing a flow of processing in the image processing apparatus.

The detailed description will now be given to how to create reproduced image data according to the present invention with reference to a flow of FIG. 2. The control based on this flow is effected by the CPU 3 based on a program stored in a ROM 11 or a RAM 12. It is to be noted that the program stored in the RAM 12 may be one read from a non-illustrated hard disk or from a CD-ROM or a floppy disk. In addition, functions of blocks other than the scanner 4 and the printer 5 in FIG. 1 may be executed by a computer. In this case, this program can be read from a CD-ROM or a floppy disk or it can be downloaded from a network.

When reading a short side width of 200 mm of an A4-size original at a resolution of 600 DPI (dot-per-inch), it is assumed that a total number of pixels read in the buffer (step 100) is 4724 pixels and existence of 40 characters on this original is detected by a histogram or the like on an image. In this case, the width of one character is determined as 4724/40=118.1 pixels (step 101). This character width is defined as a width obtained by adding a space to an actual character size.

A character size in each character width is detected by a well-know technique such as a histogram or the like (step 102) and, if 12 points equal to 100 dots, 118.1−100=18.1 pixels correspond to a spacing (character gap) between characters in the original. Based on the above-mentioned information, the character recognition is carried out with respect the entire area of the original and code data is stored in the image buffer (step 103).

Assuming that the copy magnification is set to 70% by an operator (step 104), the same 40 characters must be recorded in the width of 4724×0.7=3307 pixels. That is, the character width allocated to one character corresponds to 3306.8/40=82.67 pixels, and the character size is 12×0.7=8.4 points (70 dots) (steps 105 and 106).

In this case, since the character width is not an integer, it is preferable to set the character width to an integer that is suitable for recording. However, when the character widths are all set to 82 pixels or all set to 83 pixels, the character size can be associated with a set copy magnification whilst the character size (character gap) can be slightly different from one corresponding to the copy magnification, thereby disabling true reproduction at the set copy magnification. As a countermeasure, 82 pixels and 83 pixels are both used for the character width in one row properly and allocation is so determined as to provide 3307 pixels in the entire one row in this embodiment.

In other words, it is determined that 83 pixels correspond to 40×0.67=26.8≅27 characters and 82 pixels correspond to 40−27=13 characters. When allocating and arranging the number of characters in the original by using two types of character width, i.e., N pixels and N+1 pixels at a predetermined ratio in accordance with a set copy magnification, the characters can be arranged within the full pixel number substantially at a predetermined magnification. It is needless to say that the two kinds of character width are uniformly arranged in accordance with its ratio of a number of characters. In this example, they are uniformly arranged as 83, 83, 32, 83, 83, 82, . . . .

A character size to be expanded in the both character widths will now be described. Generally, when expanding a character font from a dictionary to dot data having an arbitrary size, the size is set to an integer. In the above-described example, when making an attempt to reproduce an image in an accurate size at a recording density of 600 DPI, the character size corresponds to 600×8.4/72=70 pixels which is an integer, but if a character in the original is 14 points, the size corresponds to 0.7×600×14/72=81.67 pixels which is not an integer.

Therefore, in such a case, two types of character size, i.e., 81 pixels and 82 pixels are set to be uniformly arranged at a ratio of 1 to 2, and it is enough to expand respective characters in different sizes in accordance with this setting (step 107).

Figure 3:
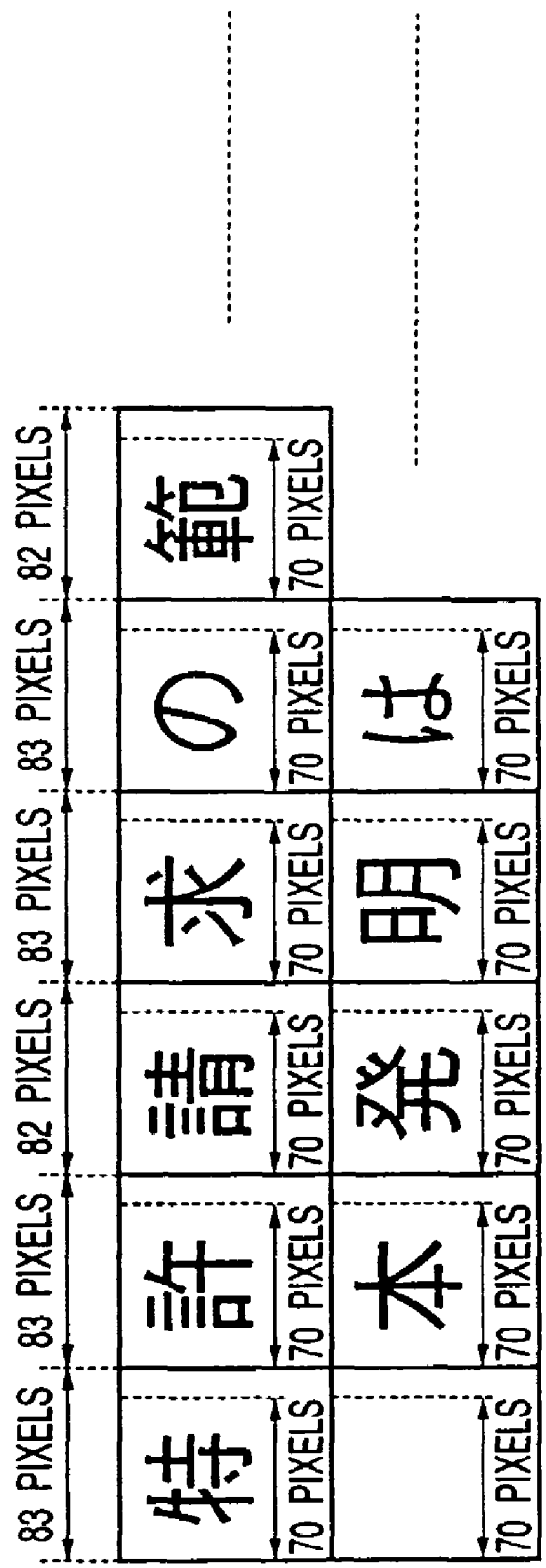
FIG. 3 is a view showing reproduced character size and character gap.

In case of a 70%-microcopied image, a character font of 8.4 points is expanded in the character widths of 82 pixels and 83 pixels respectively in a size of 70 pixels and arranged, thereby creating recording image data for one page. It is to be noted that the above description has given only as to the one-way processing but the same processing will be executed with respect to a direction orthogonal thereto. FIG. 3 shows a result of the above-described processing. An expanded character dot in a one-character region separated by the character width of 82 pixels or 83 pixels can be arranged at an arbitrary position, but it is determined that the upper left portion in the drawing is a reference position in FIG. 3.

<Determining Character Size>

In order to prevent the speed for changing the character size in one pixel increments for each character to be expanded from lowering, a fraction of the character size calculated by the operation is omitted to obtain an integer. In the above-described example, the character size is set to 81 pixels. That is, since the character width is controlled at one close to the indicated magnification, reproduction as a document is possible if the character size to be expanded in the one character width is not more than the character width.

<Determining Character Width>

In cases where a magnification is not set as a figure as in the above-described example and a fixed variable power, e.g., A4 to A5, is indicated, the character width which is 82.67 in a narrow sense in the above-described example is adjusted to an integer 82. That is, although a percentage of reduction is 82×40/4724=69.43% accurately, it is enough only if information in the A4-size original can be recorded on the A5-size paper in full. Further, a number of recordable pixels on the paper having the same size may vary depending on each recording apparatus which is actually used, and hence it is advantageous to unify numbers of pixels to a maximum character width by which no information can be missed in the entire recordable area.

<Determining Font>

Although the above-described example apparently premises that a font which is much closer to a character in the original is selected as a counter part used for a reproduced image for copying the original in the above-described example, an arbitrary font can be selected according to a direction inputted from the MMI unit 1 by an operator in order to reproduce an image.

<Resolution for Reading Image>

In the above-described example, the original is read at the equivalent magnifying power irrespective of types of the subsequent variable power processing and the like and stored in the image buffer 8, and the original information is recognized or detected. However, when the size of the original is much smaller than A4 and smallness of characters in the original as in a business card or a postcard can be predicted for example, the accuracy of recognition can be improved by enlarging and reading the original and performing the character recognition using the image signal.

As described above, according to the first embodiment, characters in an image on a read original are recognized; information relating to the characters in the read image is detected; a character font is read in accordance with a result of character recognition; and a reproduced image is generated based on these character font and information concerning the characters, thereby restraining the quality of the small characters from deteriorating during duplication. Further, when repeating copy of the image reproduced in the above-described structure as an original, the quality of the image can be prevented from being degraded.

Second Embodiment

Figure 4:
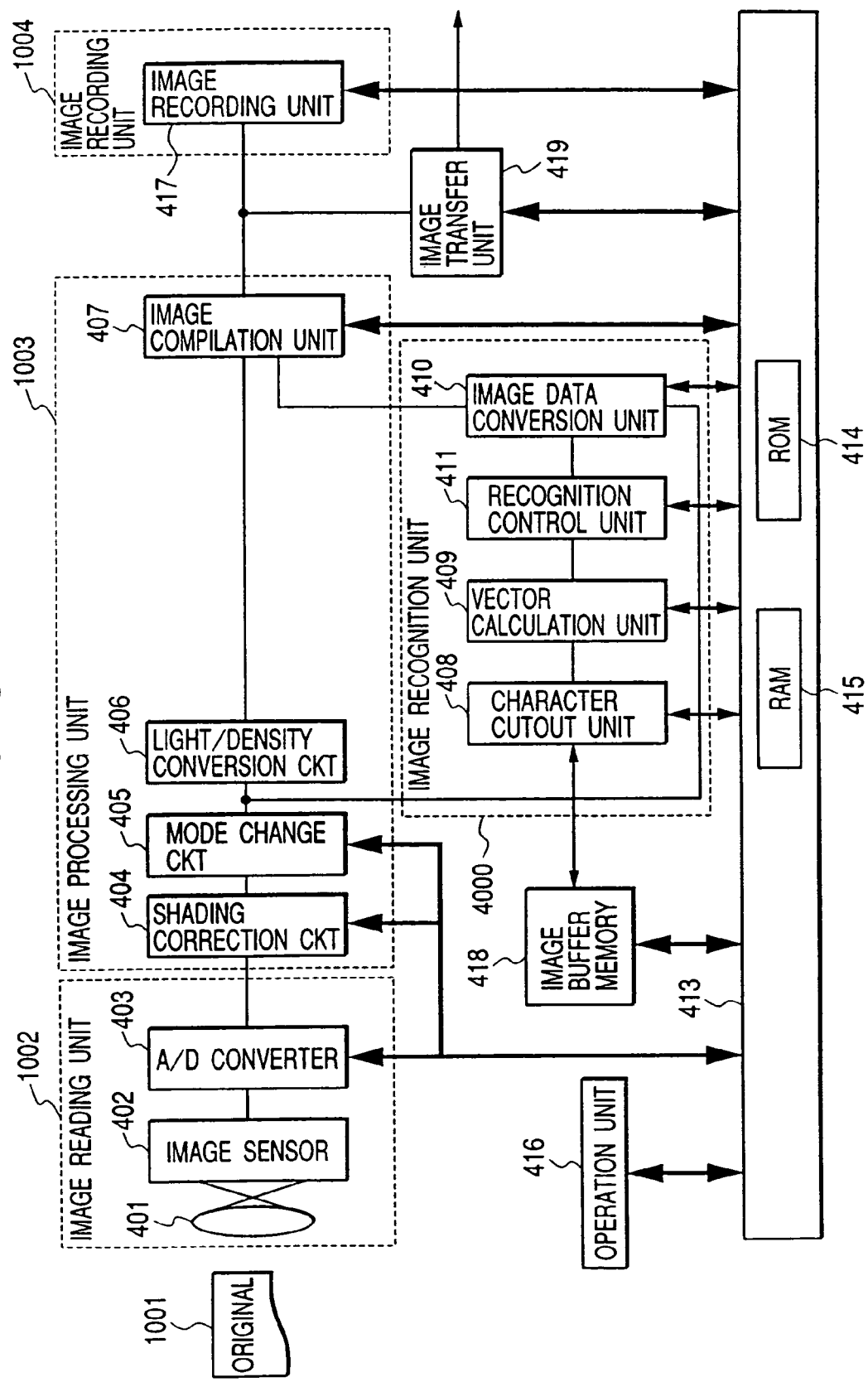
FIG. 4 is a block diagram showing a hardware structure in a second embodiment.

FIG. 4 shows a block diagram according to a second embodiment, and each constituent part and the operation thereof will be described hereinbelow.

An original 1001 is image-formed to a CCD 402 by using a lens 401 of an image reading unit 1002 and A/D-converted by an A/D converter 403. A signal obtained after A/D conversion is inputted to an image processing unit 1003. The inputted signal is further subjected to shading correction 404 in the image processing unit 1003 and supplied to a mode change circuit 405.

Here, a destination of the signal is changed based on a recognition copy mode or a normal copy mode in accordance with the setting by an operator from an operation unit 416. In case of the normal copy mode, a light/density conversion circuit 406 is used to convert brightness data into recording density data to be outputted to an image compilation unit 407. The image compilation unit 407 performs the compilation processing based on data processed according to the content of setting of the image processing stored in a RAM 415 within a CPU circuit 413. When carrying out recording reproduction, the compiled image data is outputted to an image recording unit 1004. Meanwhile, if the image information is transferred to any other system via a so-called FAX, a network such as a LAN or various personal computer IF's, predetermined processes such as compression, encoding, demodulation and others are effected in an image transfer unit 419 and the image information is thereafter outputted outside.

The image recording unit 1004 is constituted by a control circuit such as a motor for feeding transfer paper or the like, a laser control circuit for writing a video signal inputted from the image processing unit 1003 onto a photosensitive drum and a development control circuit for performing development, and records an image on a recording medium such as recording paper.

On the other hand, when the recognition copy mode is set, the destination of the signal from the mode change circuit 405 is changed to an image recognition unit 4000. The image recognition unit 4000 recognizes characters in the original by using an image buffer memory 418, and a result of recognition is transferred to an image data conversion unit 410 where a character code which is a recognition output is converted into an output font image signal.

Further, an operation unit 416 includes a group of various keys for indicating the content of image compilation, a number of copies, an image copy operation such as a variable power and the like with respect to the image processing unit 103, a group of various LED's, a display unit for displaying the content of operation and others.

Figure 5:
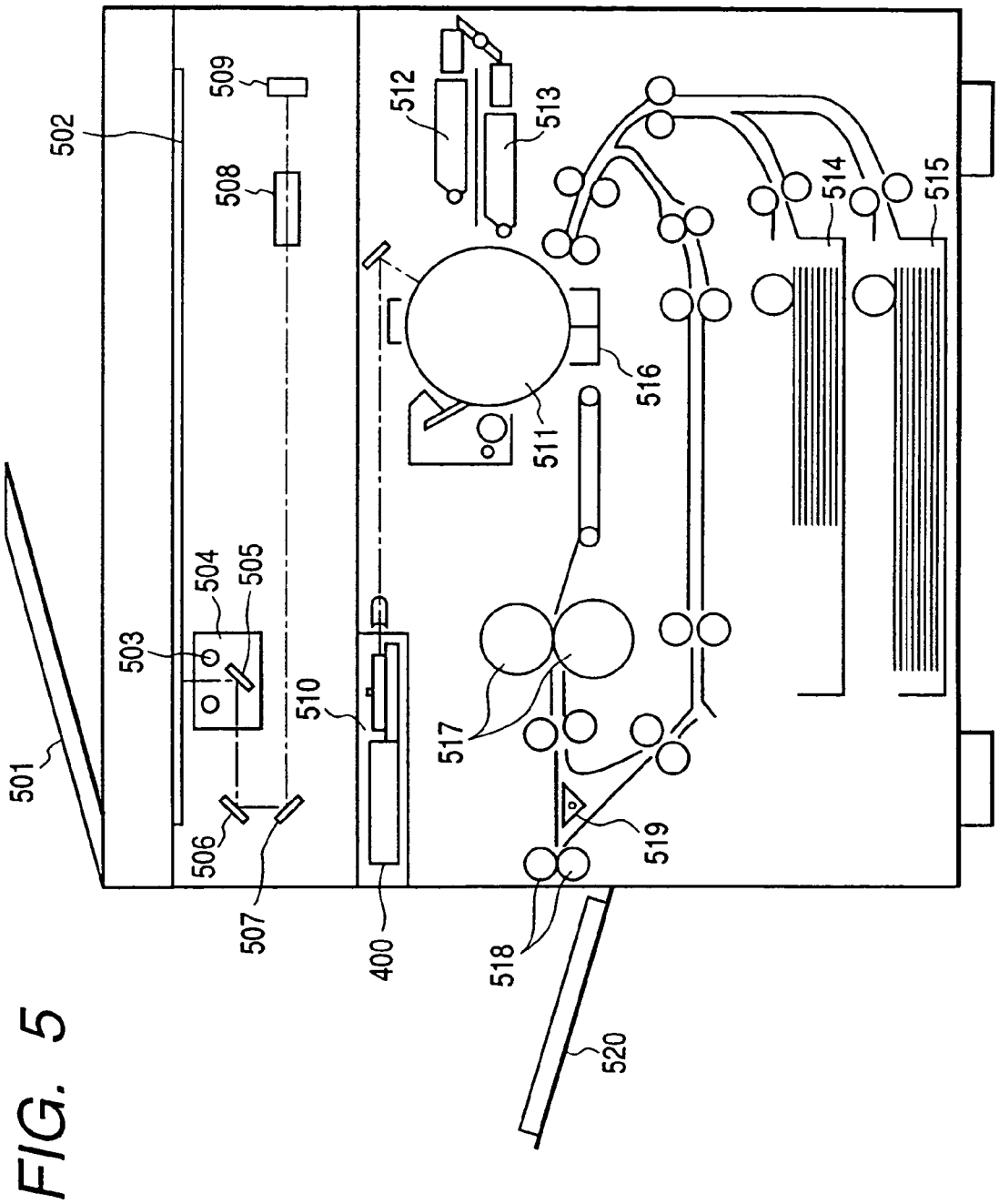
FIG. 5 is a cross-sectional view of a copying apparatus in the second embodiment.

FIG. 5 is a cross-sectional view showing the structure of the image copying apparatus in this embodiment.

In FIG. 5, numeral 501 designates an original feeding device as an original feeding means for feeding the original mounted thereon to a predetermined position on a glass platen 502 every one sheet or two sheets. Numeral 503 denotes a scanner constituted by a lamp, a scanning mirror 505 and others and, when the scanner 503 is mounted on the glass platen 502 by the original feeding device 501 and an instruction of, e.g., copy or character recognition is given from the operation unit 416, the scanner scans in a predetermined direction (horizontal direction in the drawing) to pass a reflected light ray from the original through a lens 508 via scanning mirrors 505 to 507 to form an image in an image sensor unit 509.

Numeral 400 represents a control unit having various circuits shown in FIG. 4 mounted thereon. Numeral 510 denotes an exposure unit for receiving the image signal from an image signal control unit (not illustrated) which generates the image signal based on the image data from the image compilation unit 407 within the control unit 400 to irradiate a light beam onto a photo conductor 511. Numerals 512 and 513 designate developers for visualizing an electrostatic latent image formed on the photo conductor 511 by using a developer (toner) having a predetermined color. Numerals 514 and 515 denote transfer paper mounting units for mounting and accommodating a recording medium having a fixed size therein, and the paper is fed to a position at which a resist roller is provided by driving a feeding roller and the paper is again fed in timing with alignment of an edge of an image formed on the photo conductor 511.

Numeral 516 represents a transfer separation charger which transfers a toner image developed on the photo conductor 511 to the transfer paper and is then separated from the photo conductor 511 to be fixed by a fixation unit 517 via a carrier belt. Numeral 518 designates a discharge roller which mounts and discharges the transfer paper on which the image has been already formed to a tray 20. Numeral 519 denotes a direction flapper which changes a direction to feed the transfer paper on which the image has been already formed to a discharge opening and an internal feeding direction and is prepared for the multiple/double-sided image forming process.

Figure 6:
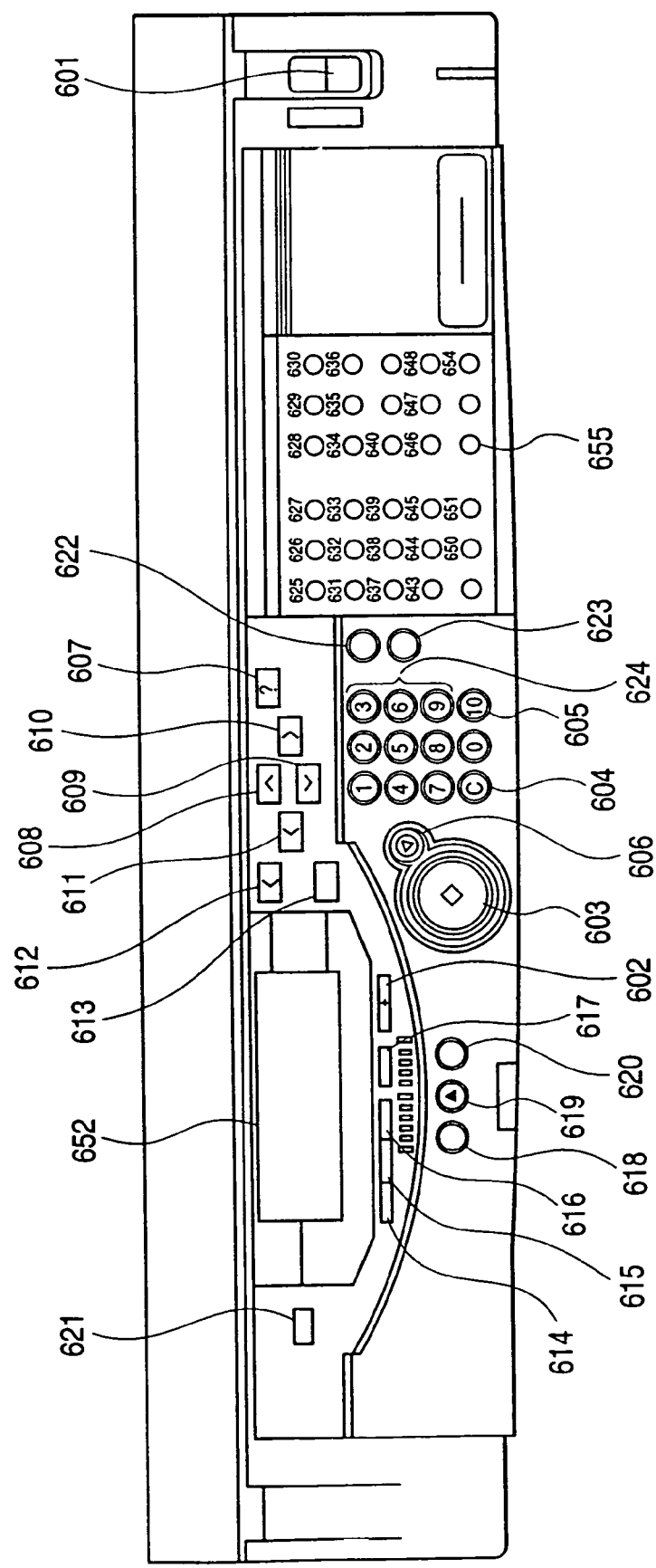
FIG. 6 is an exterior view of an operation unit in the second embodiment.

FIG. 6 is an exterior view showing the operation unit 416 used in this embodiment.

Numeral 601 designates a power supply switch for controlling power supplied to the body of the apparatus. Numeral 602 expresses a reset key which functions as a key for returning to the standard mode during standby. Numeral 603 corresponds to a copy start key. Numeral 604 denotes a clear key used for clearing a value such as a number of copies.

Numeral 605 represents an ID key which enables the copy operation with respect to a specific user and disables the copy operation with respect to any other user unless an ID is inputted by the ID key. Numeral 606 designates a stop key used for interrupting or stopping copy. Numeral 607 denotes a guide key for giving information about each function. Numeral 608 represents an upper cursor key for moving a pointer upwards in each function setting screen. Numeral 609 designates a lower cursor key for moving the pointer downwards in each function setting screen. Numeral 610 expresses a right cursor key for moving the pointer to the right-hand side in each function setting screen. Numeral 611 represents a left cursor key for moving the pointer to the left-hand side in each function setting screen. Numeral 612 denotes an OK key which is pressed in each function setting screen when everything is just fine as it is.

Numeral 613 designates a key which is pressed when executing output in the lower right portion in the screen 652 in each function setting screen. Numeral 614 represents a fixed reduction key used for scaling down a fixed size to another fixed size. Numeral 615 denotes a key which is used for selecting an equal magnification copy. Numeral 616 signifies a fixed enlargement key used for scaling up a fixed size to another fixed size. Numeral 617 denotes a cassette selection key for selecting a cassette stage used for copy. Numeral 618 represents a copy density adjustment key for reducing the density. Numeral 619 expresses an AE key for automatically adjusting the copy density relative to the density of the original. Numeral 620 denotes a copy density adjustment key for increasing the density. Numeral 621 represents a key for designating the operation of a sorter. Numeral 612 designates a preheat key used for turning on/off the preheat mode. Numeral 623 signifies an interruption key which is pressed when interrupting the copy operation to perform another copy operation. Numeral 624 denotes a ten key used for inputting a value.

Numeral 625 expresses a marker processing key for setting trimming, masking and partial processing (italic, outline processing, meshing processing, shadowing processing, negative/positive reversal processing). Numeral 626 denotes a patterning processing key used for patterning colors for expression or giving difference in density of colors for expression. Numeral 627 designates a color elimination key used for eliminating a specific color. Numeral 628 represents an image quality key used for setting the copy mode concerning the image quality, e.g., the recognition copy according to the present invention. Numeral 629 represents a meshing processing key used for executing the meshing processing. Numeral 630 designates an image create key used for carrying out the outline processing, the shadowing processing, the negative/positive reversal processing, italic, the mirror processing and the repeat processing. Numeral 631 denotes a trimming key used for specifying an area to be trimmed. Numeral 632 represents a masking key used for specifying an area to be masked. Numeral 633 designates a partial processing key for specifying an area to thereafter further specify the partial processing (italic, outlining, meshing, shadowing and negative/positive reversal). Numeral 634 denotes a frame erasing key used for erasing a frame in accordance with each mode. The modes include: a sheet frame erasing mode (creating a frame relative to a sheet size); an original frame erasing mode (creating a frame in accordance with the original size. The original size is specified); and a book frame erasing mode (creating a frame and a blank in the central part in accordance with a two-page spread size of a book. The book two-page spread size is specified). Numeral 635 represents a stitch width key used for creating a stitch width on one end of the paper.

Numeral 636 denotes a movement key for moving an image in a desired area, which is used for moving the image. The types of movement include: a parallel movement (vertical and horizontal movements); a center movement; a corner movement; and a specified movement (a point specified movement). Numeral 637 represents a zoom key by which the copy magnification can be set from 25% to 400% in 1% increments. Further, the main scanning and the sub scanning can be independently set. It is to be noted that the variable power for the image in the sub scanning direction on the original can be set by controlling the moving speed of the scanner 503 whilst that in the main scanning direction on the original can be set by performing the pixel skipping or interpolation of the image data read by the scanner 503.

Numeral 638 designates an auto variable power key for automatically scaling up and down in accordance with a size of copy paper. Further, the main scanning and the sub scanning can be independently subjected to auto magnification change. Numeral 639 denotes an enlarged continuous copy key used for scaling up and copying one sheet of the original to multiple sheets. Numeral 640 represents a reduced layout key used for scaling down and copying multiple sheets of the original on one sheet. Numeral 643 denotes a continuous copy key used for horizontally dividing a copy area on the glass platen into two and performing the continuous copy for automatically copying two sheets (page continuous copy, double-sided continuous copy). Numeral 644 designates a double-side key used for outputting the double-sided copy (single-sided-double-sided, page continuous copy—double-sided, double-sided-double sided). Numeral 645 represents a multiplex key used for multiplexing (multiplexing, multiplexing of page continuous copy). Numeral 646 indicates a memory key used for effecting a mode using a memory (memory synthesizing, area synthesizing, watermark synthesizing). Numeral 647 designates a projector key which is used when a projector is needed. Numeral 648 denotes a printer key used for setting use of a printer. Numeral 650 represents an original consolidation key used to copy with a feeder when the original having the various sizes is mounted. Numeral 651 denotes a mode memory key used for calling a registered copy mode in order to register the copy mode set for copy. Numeral 652 designates a liquid crystal display unit having a touch panel, which displays the state of the apparatus, a number of copies, the magnification of copy and the size of copy paper or displays the mode setting of the normal copy mode and the content of the set copy mode.

In regard of the FAX function, a destination or various kinds of transmission mode can be set by pressing the key 655 to perform display of the liquid crystal display unit having a touch panel and inputting from the touch panel key. For example, in G3, a two-valued image signal is compressed and encoded to be transmitted at the resolution of 8×3.85 lines/mm in the standard mode; 8×7.7 lines/mm in the fine mode; and 16×15.4 lines/mm in the super fine mode.

Figure 7:
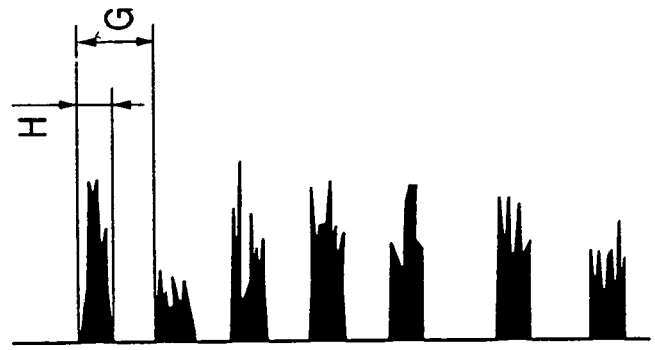
FIG. 7 is a projected view of characters in the second embodiment.

The character recognition unit characterized in the present invention will now be described in detail hereunder. The image signal read at 600 DPI that is a maximum resolution in the present system and stored in the image buffer memory 418 for the recognition processing is supplied to a character cutout unit 408 where the binary-coded image is obtained and divided into average character meshes each of which includes one character based on the projection in orthogonal two directions. FIG. 7 is a view showing the state of projection in one direction. An average line gap G and an average character height H are obtained from this histogram, and the average character mesh including one character may be set based on these values. The size of a character to be recognized according to the present invention can be specified based on the size of each mesh to which the image is divided. Meanwhile, the character in each mesh is normalized and its quantity of characteristic is obtained as an unknown character vector by a vector calculation unit 409. When, for example, the quantity of characteristic of an unknown character is inputted to the recognition control unit 411, this control unit calculates a minimum distance from a standard pattern of each group to the unknown character in each step of multiple steps in which consecutive similar standard patterns are grouped to constitute the next step along a tree structure of a dictionary belonging to the control unit. This control unit performs the descending retrieval along the tree structure while forming a path linking groups giving the minimum distance and outputs a result of character recognition in the minimum distance obtained in the final step as a recognized character.

Figure 8:
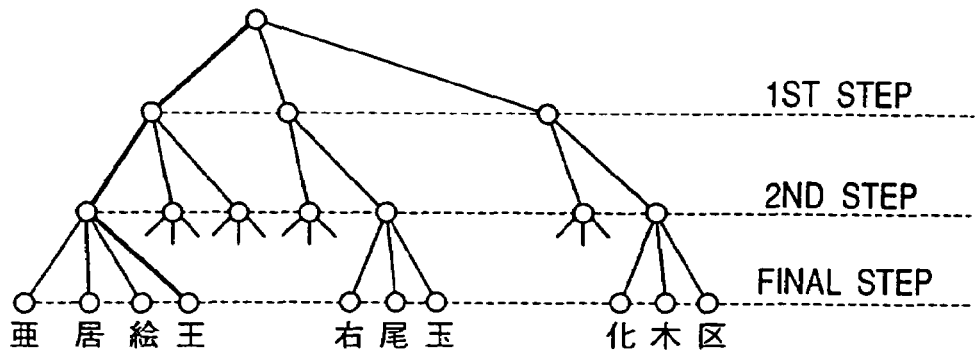
FIG. 8 is a tree diagram for explaining the character recognition processing.
Figure 10:
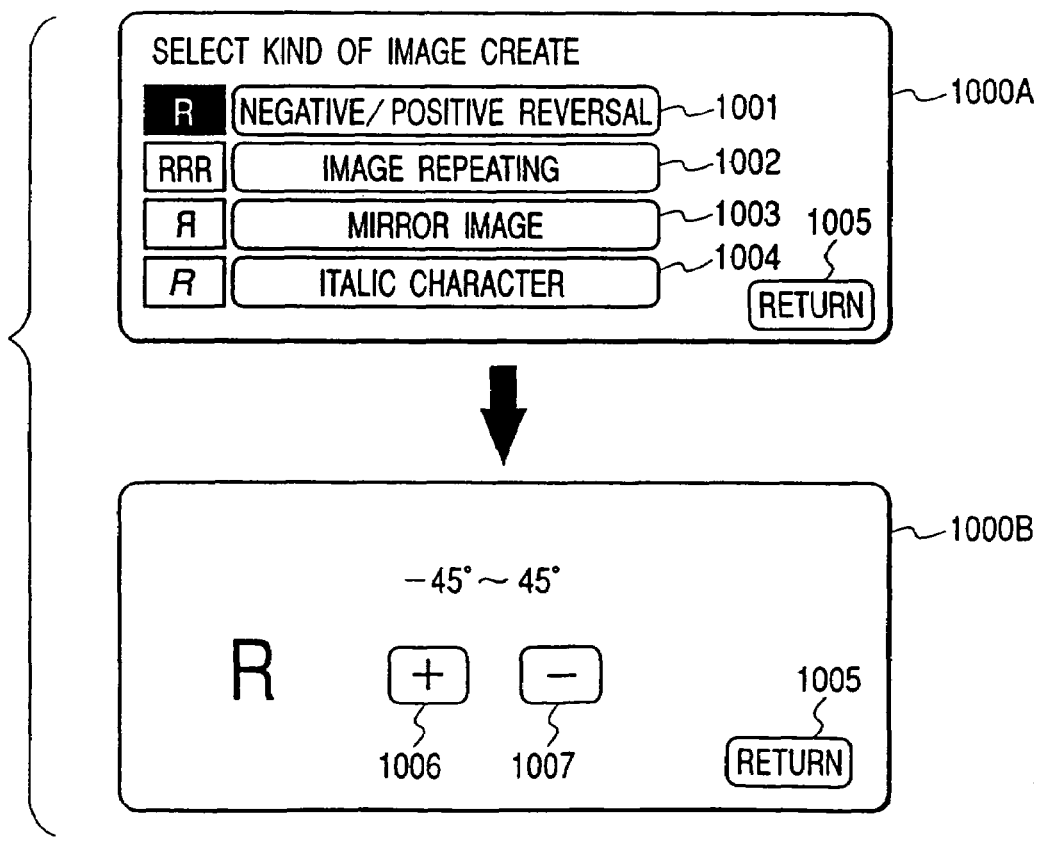
FIG. 10 is a view showing an operation screen of an image creation function.

FIG. 8 shows the above-described recognition method using a dictionary having the tree structure in case of recognizing an unknown character "王".

Here, assuming that a standard pattern vector (quantity of characteristic) in an i-th group in one step in the dictionary having the tree structure is represented as $*v^i$ and an input vector of the unknown character as $*u$, the distance between the vector $*vi$ and the vector $*u$ can be expressed as follows with r as a dimensional number for the vector:

$$di \sum_{K=0}^{r-1} |*v^i K - *uK|$$

where $*v^i=(v^i{}_o, v^i{}_1, \ldots, v^i{}_{r-1})$ $*uk$ $(u_o, u_1, \ldots, u_{r-1})$ This is the above-mentioned distance to be obtained and, in each step, a group by which this distance is minimum is selected and the path to the character " 王 " in the final step shown in FIG. 8 is formed.

When the image included in each mesh is recognized by using a dictionary in this manner, if the image in the mesh is not a character, for example, if it is a part of a line segment constituting a chart or symbol, a specific character or a symbol stored in the dictionary is regarded as having the minimum distance irrespective of an absolute value of this distance. Therefore, when a part of a rule mark is orthogonal to a numeric character " — ", they are converted into another numeric character " 十 ". Thus, assuming that the distance to the character obtained in the final step is V, the following judgment is made:

V<K . . . the content of the mesh is a character
Otherwise . . . the content of the mesh is other than characters
(K is a constant)

That is, the input is determined as a character only when the distance V is not above a predetermined value K, and it is determined as the image information in any other case. Therefore, if V<K in the example shown in FIG. 8, an image data conversion unit 410 converts the input into dot data by using a font ROM thereof based on a two-byte code indicative of the character " 王 ". Accordingly, if V≦K in the recognition control unit 411, the image data stored in the image buffer memory is selected and transmitted to the image compilation unit, whilst if V<K, the corresponding font data is selected and transmitted to the same, respectively.

By carrying out the above-described processing with respect to all the meshes, the character portion can be recorded and displayed by using a recognized character font, and any area other than characters can be also recorded and displayed as a reproduced image in which the font data and the image information similar to that in the prior art copying machine are mixed.

When reproducing an image by mixing the image information and the font data in this manner, the quality of a reproduced image can be improved by using the font data which matches to a character style of characters in the original. Recognition of a character style will now be described as a characteristic of the present invention with reference to a flow chart in FIG. 9.

Figure 9:
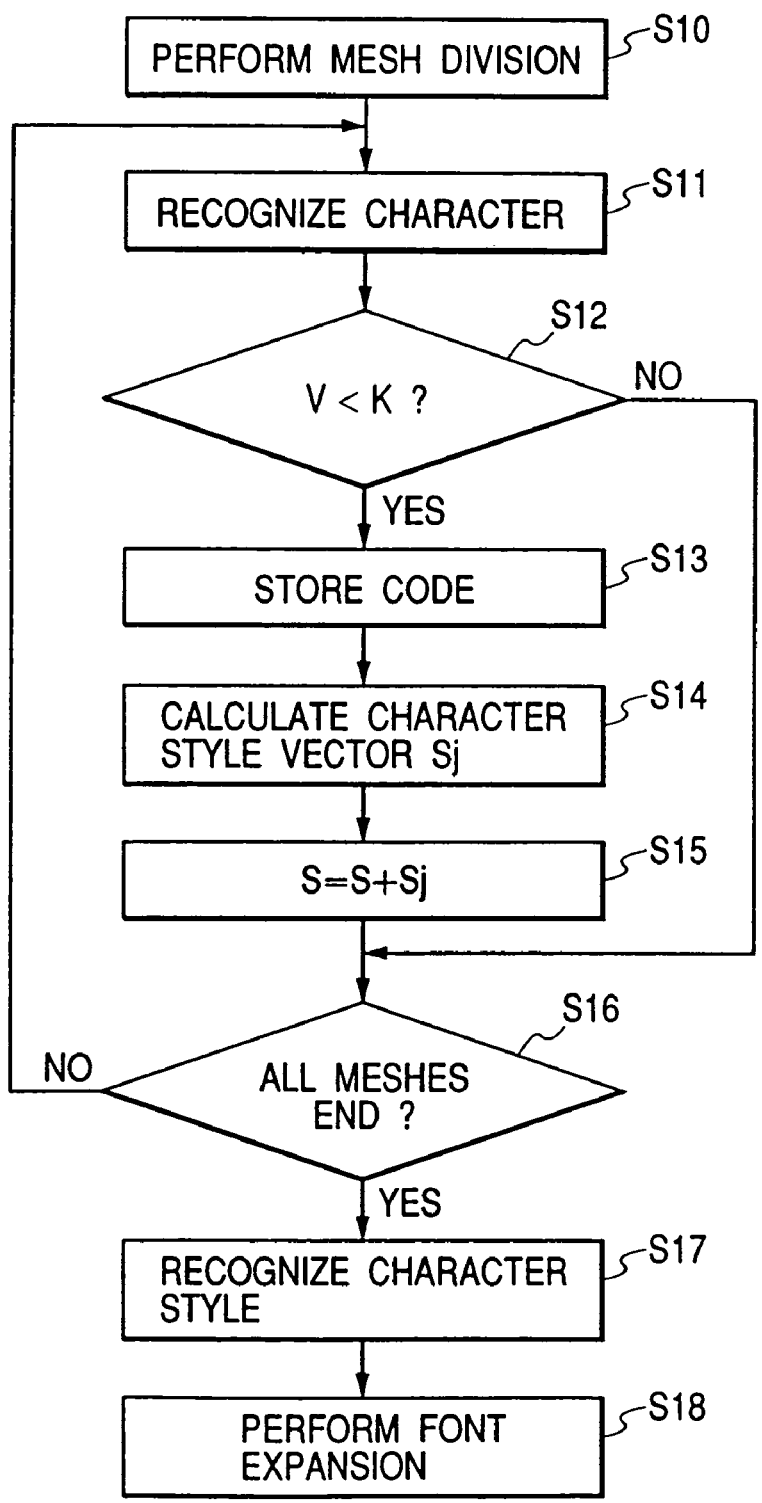
FIG. 9 is a flow chart in the second embodiment.

Referring to FIG. 9, a quantity of characteristic is calculated from an image signal in each mesh which is obtained by performing mesh division S10 as mentioned above and, if the minimum distance V is not more than the predetermined value K as a result of character recognition S11 using a dictionary, two-byte information is stored S13 at its mesh address as a character code.

In this case, since the probability that the recognized image corresponds to a character is apparently high, a quantity of characteristic of a character style Sj is calculated. This quantity of characteristic is a physical quantity which is typical in, for example, a thickness distribution of a line segment and mainly used for recognition of Ming, Gothic, italic or the like. This quantity of characteristic for each mesh is sequentially added S15 and this addition is repeated relative to the images in all the meshes. Upon completion S16, the average quantity of characteristic of the character style integrated in S15 is used to carry out the character recognition S17 by utilizing a dictionary prepared in advance.

It is to be noted that font expansion S18 is performed using a determined character style. Incidentally, since the process is jumped from S12 to S16 when the distance V is not less than K, the quantity of characteristic of a figure and the like is not added in S15, and hence the accurate recognition is possible in the character style recognition S17. It is to be noted that the character size obtained during the mesh division and the recognized character style can be used for substitution of the font data which is faithful to the original but the font expansion using a predetermined character style is also possible irrespective of a result of character style recognition. Description will be given as to the italic conversion as an example.

When the image create function is selected by the above-mentioned operation key 630, the screen of the liquid crystal display 652 is changed to a screen 1000A in which an italic character key 1004 is selected. When the italic character is selected, the screen is further changed to another screen 1000B in which an italic angle is set. Each recognized character is expanded in the italic font having the italic angle set by adjusting increase/decrease keys 1006 and 1007, thereby completing substitution.

Arranging the expanded italic font data in such a manner that the center of the data is in suit with that of each mesh enables conversion into the italic without deviating from the first character position in the original.

In the prior art, since this italic function is realized by reading the character as an image and sequentially shifting the image signal in an alignment direction of the CCD sensor for a very small number of pixels every line, an image portion other than characters is also rhombically deformed and top positions of character lines can not be aligned in the front and rear edges of the image, thus restricting the usage. According to the present invention, however, the italic processing is possible only to a complete character portion.

It is to be noted that the trimming key 631 can be used to perform the italic conversion with respect to only characters in a predetermined area.

Description will now be given as to the font expansion using a set specific resolution when transferring a reproduced image signal to another system such as a FAX. In case of the present invention, even if a resolution required for a final image to recognize character in the original is low, the recognition processing must be effected at a high resolution by which stable recognition is possible. Therefore, conversion into a directed resolution is carried out during the font expansion of a recognized character.

If the recognized characters in the original have a size of 14 points, each recognized character is expanded to recording dots having approximately 117×117 pixels when recording and reproducing at a recording density of 600 DPI as usual. Now, assuming that the image transmission in the FAX standard mode is selected, since the recording density is 8×3.85 lines/mm, each recognized character is expanded to dots having 40×19 pixels in order to record and display each character in the size equal to 14 points at a destination. Similarly, when transmitting and inputting each recognized character to another personal computer or the like at the resolution of 300×300 DPI for example, the character is expanded into dots having 58×58 pixels.

It is to be noted that the usual resolution conversion from 600 DPI to a specified resolution is carried out with respect to the so-called image data which can not be character-recognized in order that the image data can be recorded and displayed as an image having the same size at a destination.

Third Embodiment

If a resolution during transmission is low and a size of recognized characters is small, the font expansion by which a number of dots becomes smaller than that of an usual font must be carried out. In this case, the size is unchanged but the characters become unclear due to the pixel skipping processing. Therefore, the dot expansion is executed by using a rough character font in accordance with a recognized character size and a resolution. For example, it is determined as follows:

The rough character font expansion is performed in case of not more than 100DPI and not more than 12 points;

The rough character font expansion is performed in case of 200-100 DPI and not more than 10 points;

The rough character font expansion is performed in case of 400-200 DPI and not more than 8 points;

The rough character font expansion is performed in case of 600-400 DPI and not more than 5 points; and The usual font expansion is performed in any other case.

It is to be noted that the above-described setting can be changed by a user.

Fourth Embodiment

The above has explained the image create function relative to italic characters in the font expansion and, similarly, various kinds of character ornament processing such as the meshing processing, the negative/positive reversal processing, the outline processing, the shadowing processing and others are possible with respect to recognized characters. At any rate, they are carried out for each font in the font expansion relative to each character.

As mentioned above, according to the second to fourth embodiments, the reproduced image signal can be obtained at a desired resolution without lowering the recognition accuracy.

It is to be noted that the present invention may be applied to a system having multiple constituent devices (for example, a host computer, an interface device, a reader, a printer and others) or to an apparatus constituted by a single device (for example, a copying machine, a facsimile machine and others).

Further, it goes without saying that the object of the present invention can be also achieved by supplying a recording medium having a program code of a software for realizing functions of the foregoing embodiments to a system or an apparatus and thereafter reading and executing the program code stored in the recording medium by a computer (or a CPU or an MPU) in the system or the apparatus.

In such a case, the program code itself read from the recording medium realizes the functions of the above-described embodiments, and the recording medium storing the program code therein constitutes the present invention.

As a recording medium for supplying the program code, a floppy-disk, a hard disk, an optical disk, a magneto-optical disk, a CD-ROM, a CD-R, a magnetic tape, a non-volatile memory card, a ROM and others can be used for example.

Additionally, it is needless to say that executing the program code read by the computer not only realizes the functions of the above-described embodiments, it also causes an OS (operating system) or the like which is operated on the computer to execute a part or all of the actual processing based on indications of the program code, thereby realizing the functions of the above-described embodiments by this processing.

Further, when the program code read from the recording medium is written in a memory provided in a function extending board inserted into the computer or a function extending unit connected to the computer and thereafter a CPU or the like provided in the function extending board or the function extending unit executes a part or all of the actual processing based on indications of the program code, the functions of the above-described embodiments are likewise realized by this processing of course.

Although the present invention has been described in connection with the preferred embodiments, the present invention should not be restricted to these embodiments and it is apparent that various modifications and applications are possible within a true scope of the appended claims.

What is claimed is:

1. An image processing apparatus comprising:
    a reading unit constructed to read an image in an original;
    a character recognizing unit constructed to recognize a character in the image read by said reading unit and to output a character code as a result of recognition;
    a storing unit constructed to store a character font;
    a readout unit constructed to read the character font from said storing unit based on the character code output by said character recognizing unit;
    a detecting unit constructed to detect a first character size concerning the character in the image read by said reading unit;
    a setting unit constructed to set a magnification ratio based on an instruction by an operator;
    a determining unit constructed to determine a second character size based on the first character size and the magnification ratio;
    a selecting unit constructed to select a type of the character font stored in said storing unit based on an instruction by the operator; and
    a generating unit constructed to generate a reproduced image, which includes characters having the second character size, based on the character font, the type of which is selected by said selecting unit,
    wherein said generating unit generates the reproduced image by selectively allocating one of a plurality of character gap widths between each adjacent character, with a sum of plural character widths, each of said character widths corresponding to a combination of a width of the second character size and one of the plurality of character gap widths, being fit to a width of the image read by said reading unit multiplied by the magnification ratio.

2. An image processing apparatus according to claim 1, wherein the determining unit determines the second character size as a maximum size by which all characters in the original can be reproduced as reproduced images.

3. An image processing apparatus according to claim 1, wherein said generating unit reproduces characters by combining two or more of the plurality of character gap widths when a number of pixels of a character gap calculated in accordance with the magnification ratio is not an integer.

4. An image processing method comprising the steps of:
    reading an image in an original;
    detecting a first character size information concerning a character in the image;
    recognizing a character in the image and outputting a character code as a result of recognition;

reading a character font from a storing unit based on the character code;

setting a magnification ratio based on an instruction by an operator;

determining a second character size based on the first character size and the magnification ratio;

selecting a type of the character font based on an instruction by the operator; and generating a reproduced image, which includes characters having the second character size, based on the read character font, the type of which is selected by said selecting step, wherein said generating step generates the reproduced image by selectively allocating one of a plurality of character gap widths between each adjacent character, with a sum of plural character widths, each of said character widths corresponding to a combination of a width of the second character size and one of the plurality of character gap widths, being fit to a width of the image read by said reading unit multiplied by the magnification ratio.

5. A method according to claim 4, wherein said method enables to output the reproduced image in an image processing apparatus which can form on a sheet an image based on data input from at least any of a plurality of data generation sources including an original reading unit and an external apparatus.

6. A method according to claim 4, wherein said method enables to output the reproduced image in an image processing apparatus which can transmit data to an external apparatus through at least any of a plurality of data transmission media including a personal computer interface and a network.

7. A recording medium readable by a computer characterized by storing a program therein, said program using the computer to execute the processing comprising the steps of:

reading an image in an original;

detecting a first character size information concerning a character in the image;

recognizing a character in the image and outputting a character code as a result of recognition;

reading a character font from a storing unit based on the character code;

setting a magnification ratio based on an instruction by an operator;

determining a second character size based on the first character size and the magnification ratio;

selecting a type of the character font based on an instruction by the operator; and generating a reproduced image, which includes characters having the second character size, based on the read character font, type of which is selected by said selecting step, wherein said generating step generates the reproduced image by selectively allocating one of a plurality of character gap widths between each adjacent character, with a sum of plural character widths, each of said character widths corresponding to a combination of a width of the second character size and one of the plurality of character gap widths, being fit to a width of the image read in said reading step multiplied by the magnification ratio.

\* \* \* \* \*